US012808806B2

(12) United States Patent
Reusch

(10) Patent No.: US 12,808,806 B2
(45) Date of Patent: Nov. 24, 2026

(54) METHOD AND SYSTEM FOR REMOTE CHLOROPHYLL DETECTION AND DETERMINATION OF MEASUREMENT REGIONS FOR CHLOROPHYLL DIRECT MEASUREMENT

(71) Applicant: Yara International ASA, Oslo (NO)

(72) Inventor: Stefan Reusch, Dülmen (DE)

(73) Assignee: YARA INTERNATIONAL ASA, Oslo (NO)

( * ) Notice: Subject to any disclaimer, the term of this patent is extended or adjusted under 35 U.S.C. 154(b) by 109 days.

(21) Appl. No.: 19/112,741

(22) PCT Filed: Sep. 18, 2023

(86) PCT No.: PCT/EP2023/075593
§ 371 (c)(1),
(2) Date: Mar. 18, 2025

(87) PCT Pub. No.: WO2024/061801
PCT Pub. Date: Mar. 28, 2024

(65) Prior Publication Data

US 2026/0098809 A1 Apr. 9, 2026

(30) Foreign Application Priority Data

Sep. 20, 2022 (EP) .................................... 22196661

(51) Int. Cl.
*G01N 21/63* (2006.01)
*A01B 79/00* (2006.01)
(Continued)

(52) U.S. Cl.
CPC ....... *G01N 21/6486* (2013.01); *A01B 79/005* (2013.01); *A01B 79/02* (2013.01);
(Continued)

(58) Field of Classification Search
CPC ............... G01N 21/6486; G01N 21/84; G01N 2021/635; G01N 2021/8466;
(Continued)

(56) References Cited

U.S. PATENT DOCUMENTS

2008/0239293 A1* 10/2008 Fuchigami ......... G01N 21/3151 356/73
2011/0047867 A1 3/2011 Holland
2016/0202679 A1 7/2016 Bermudez Rodriguez et al.

FOREIGN PATENT DOCUMENTS

CN 107014763 B 11/2019
EP 3528608 A1 8/2019

OTHER PUBLICATIONS

International Search Report and Written Opinion issued in App. No. PCT/EP2023/075593, dated Dec. 22, 2023, 14 pages.
(Continued)

*Primary Examiner* — Blake C Riddick
*Assistant Examiner* — Mamadou Faye
(74) *Attorney, Agent, or Firm* — DILWORTH IP, LLC

(57) ABSTRACT

System and method for remotely determining a chlorophyll concentration in crops present in agricultural fields, wherein a chlorophyll related vegetation index is combined with a water related vegetation index to determine a chlorophyll concentration. Further embodiments for the combination of remote and local sensing are included as well as the determination of measurement regions for that goal are disclosed.

18 Claims, 9 Drawing Sheets

(51) Int. Cl.
*A01B 79/02* (2006.01)
*A01C 21/00* (2006.01)
*G01N 21/64* (2006.01)
*G01N 21/84* (2006.01)
*G06V 10/58* (2022.01)
*G06V 20/10* (2022.01)

(52) U.S. Cl.
CPC ........... *A01C 21/007* (2013.01); *G01N 21/84* (2013.01); *G06V 10/58* (2022.01); *G06V 20/188* (2022.01); *G01N 2021/635* (2013.01); *G01N 2021/8466* (2013.01)

(58) Field of Classification Search
CPC .... G01N 2021/1797; G01N 2201/0214; A01B 79/005; A01B 79/02; A01C 21/007; G06V 10/58; G06V 20/188; G06Q 50/02
See application file for complete search history.

(56) References Cited

OTHER PUBLICATIONS

Serrano, Joao et al. "Evaluation of normalized difference water index as a tool for monitoring pasture seasonal and inter-annual variability in a Mediterranean agro-silvo-pastoral system." Water 11.1 (2019): 62.

* cited by examiner

METHOD AND SYSTEM FOR REMOTE CHLOROPHYLL DETECTION AND DETERMINATION OF MEASUREMENT REGIONS FOR CHLOROPHYLL DIRECT MEASUREMENT

TECHNICAL FIELD

The present disclosure relates to the field of precision agriculture and chlorophyll concentration determination by means of remote spectral data, for example by means of satellite or other remote imagery systems, for determining a fertilizer recommendation. The present disclosure further relates to the combination of remote spectral data and local measurements as well to the determination of suitable measurement regions for determining local measurement devices to determine a chlorophyll concentration of a crop. The present disclosure aims as well at determining fertilizer recommendations and its further application on fields.

Background and Prior Art

Determining the appropriate amount of fertilizer a crop needs is one of the most important decisions a farmer will encounter. Amongst the different methods for estimating crop nutrient status in crops, the use of remote imagery generated by satellites or other equivalent unmanned aerial vehicles has gained importance in the actual field due to the readily available solutions from different providers. Remote sensing allows determination of crop nutrient status of remote fields without the need of in-field inspection.

However, remote imagery entails well-known disadvantages due to the nature of remote observations, wherein the readings are affected by natural phenomena like weather and atmospheric conditions. Moreover, remote methods are not able of precisely assessing magnitudes wherein different factors may influence the readings. For example, typical satellite observations measure chlorophyll content in an image (total chlorophyll per ground area) and the reading is not only dependent of the concentrations of chlorophyll, but as well dependent on the amount of dry-matter present in that ground area. In view of different in-field variations of plant density and existing biomass, the determination of chlorophyll concentration by remote means is a cumbersome task.

Chlorophyll is directly related to the amount of Nitrogen present in crops, wherein Nitrogen represents one of the main nutrients plants need for growth and a precise determination of the chlorophyll concentration is of great importance for determining the fertilizer needs of a crop.

Further, approaches in the prior art combining remote and local sensing are known, like for example from EP3528608. However, no specific considerations of the importance of the chlorophyll levels are present nor about the specific locations where direct local measurements should be conducted.

Handheld devices for direct measurement of crop nutrient or nitrogen levels are well known in the prior art, like for example as shown in U.S. Pat. No. 7,746,452. Some of these devices usually determine the chlorophyll concentration or content (directly related to nitrogen content) or other nutrients by means of optical measurements. However, these devices can only determine the plant status of a single plant each time, therefore rendering the determination of variable rate application of fertilizers difficult. Previous approaches comprised as well collection of plant tissue and for a laboratory analysis, with the associated time delays. While there are several approaches for non-direct determination of the nitrogen content in plants via the special optical properties of chlorophyll (N-Sensor®, Greenseeker®), wherein the sensing devices are integrated in agricultural machines which can be transported continuously over the field, reaching a full determination of the crop status over the whole field, these solutions are expensive, time intensive and therefore not widely available or convenient for the average farmer.

SUMMARY

Current approaches for determining remotely a crop chlorophyll amount or crop nutrient status do not take into consideration the above-mentioned problems. The current disclosure aims at providing solutions for such a remote determination of chlorophyll concentration in crops by means of remote imagery. Moreover, a combination of said remote sensing approaches with a direct local determination of chlorophyll concentration is intended for a more accurate determination of the crop chlorophyll concentration and/or the generation of fertilizer recommendations and their application on crops.

According to a first aspect of the current disclosure, this and other objectives are achieved by a computer-implemented method for remotely determining a chlorophyll concentration of a crop in an agricultural field, wherein the method comprises the steps of receiving remote spectral data from a plurality of wavelengths of the agricultural field, wherein the plurality of wavelengths comprises at least one wavelength from a water absorption band and at least one from a chlorophyll absorption band; generating a first index, wherein the first index is a chlorophyll related vegetation index based on the at least one leaf pigment absorption band of said spectral data; generating a second index, wherein the second index is a water related vegetation index based on the at least one water absorption band of said spectral data; determining the chlorophyll concentration of the crop based on the chlorophyll related vegetation index and the water related vegetation index.

Following this approach, a chlorophyll concentration of the crop independent from the present biomass is achieved.

According to a second embodiment, determining the chlorophyll concentration based on the chlorophyll related vegetation index and the water related vegetation index comprises determining a chlorophyll related biomass invariant vegetation index.

Following this approach, a vegetation index directly related to chlorophyll concentration is achieved, hereby simplifying further processing and treatment of the chlorophyll concentration data.

According to a third embodiment, determining a chlorophyll related biomass invariant vegetation index comprises establishing a deviation from a determined relationship between the first index and the second index, wherein at least one of the first vegetation index and the second vegetation index has been offset and scaled by means of crop dependent constants.

Following this approach, crop specific properties are taken into account.

According to a further embodiment, the water related vegetation index is based on at least one additional wavelength outside water absorption bands.

Following this approach, the water content detection is improved.

According to a further embodiment, the at least one wavelength from a water absorption band is chosen at the edge of the water absorption band.

Following this approach, the sensitivity of the water content detection is improved.

According to a further embodiment, the method further comprises the steps of receiving at least one chlorophyll concentration measurement of the crop measured with a chlorophyll concentration measurement device; determining the chlorophyll concentration of the crop based on the remotely determined chlorophyll concentration and the received measured crop chlorophyll concentration.

Following this approach, remote determination of the chlorophyll concentration is improved by means of local sensing.

According to a second aspect, the method further comprises determining at least one measurement region for carrying out at least one measurement with a crop nutrient measurement device in said measurement region for providing a fertilizer recommendation to a crop based on the determined chlorophyll concentration.

Following this approach, specific measurement regions are determined where the local measurements can be conducted appropriately.

According to a further embodiment, the method further comprises receiving a crop nutrient measurement and determining a fertilizer recommendation based on the crop nutrient measurement and the determined chlorophyll concentration.

Following this approach, a combined approach wherein different measurement devices can be used and the fertilizer recommendation benefits from the combination of remote and local measurement is achieved.

According to a further embodiment, the crop nutrient measurement device is a chlorophyll concentration measurement device and the method further comprises the steps of receiving a chlorophyll concentration measurement of the crop at the at least one measurement region measured with the chlorophyll concentration measurement device and adjusting the remotely determined chlorophyll concentration of the crop based on the received chlorophyll concentration measurement.

Following this approach, the combination of local and remote sensing is improved.

According to a further embodiment, determining at least one measurement region comprises determining at least one first measurement region and at least one second measurement region; wherein the at least one first measurement region is selected amongst the areas of the agricultural field wherein the crop chlorophyll concentration is within a first predetermined threshold from a first predetermined value of the crop chlorophyll concentration in the agricultural field and wherein the at least one second measurement region is selected amongst the areas of the agricultural field wherein the crop chlorophyll concentration is within a second predetermined threshold from a second predetermined value of the crop chlorophyll concentration in the agricultural field.

Following this approach, further crop dependent parameters can be omitted for the determination of the fertilization recommendation.

According to a further embodiment, the method further comprises receiving at least one first crop nutrient measurement at the first measurement region; receiving at least one second crop nutrient measurement at the second measurement region and determining a fertilizer recommendation based on the at least one first and at least one second crop nutrient measurements and/or the determined chlorophyll concentration.

Following this approach, different crop nutrient measurement devices may be employed at the determined regions combined with the determined chlorophyll.

According to a further embodiment, the method further comprises determining a fertilizer recommendation based on the at least one first and at least one second crop nutrient measurements and/or the determined chlorophyll concentration.

According to a further embodiment, the crop nutrient measurement device is a crop chlorophyll concentration measurement device.

Following this approach, a direct relation with the remotely determined crop chlorophyll concentration and the measurements can be established.

According to a further embodiment, the method further comprises receiving at least one first crop chlorophyll concentration measurement at the first measurement region; receiving at least one second crop chlorophyll concentration measurement at the second measurement region and determining a fertilizer recommendation based on the at least one first and at least one second crop chlorophyll concentration measurements.

Following this approach, an improved combination of local and remote sensing for the generation of a fertilizer recommendation is improved.

According to a further embodiment, a fertilizer recommendation is determined based on the ratio of the first crop chlorophyll concentration and the second crop chlorophyll concentration.

Following this approach, an improved fertilizer recommendation is achieved.

According to a further embodiment, the method further comprises carrying out a fertilizer application based on the determined and/or adjusted chlorophyll concentration of the crop.

According to a further embodiment, the method further comprises generating instructions for an agricultural apparatus to carry out a fertilizer application based on the determined and/or adjusted chlorophyll concentration of the crop.

Following these approaches, crop yield and quality is improved.

According to further aspects, a system, a data processing apparatus, a computer-readable storage medium, and a computer program product configured to carry out the above discussed methods are envisaged within the present disclosure.

According to a further aspect, the current application claims a (first) system for determining a chlorophyll concentration configured to carry out the above discussed method(s) according to the first aspect.

According to a further aspect, the current application claims a (second) system for determining at least a measurement region for providing a fertilizer recommendation to a crop configured to carry out the above-discussed method (s) according to the second aspect.

According to a further embodiment, the (second) system further comprises a display and an input unit, wherein the system further comprises a graphical user interface, GUI, configured to display a plurality of measurement regions, wherein the graphical user interface is further configured to receive an input for selecting one measurement region from the plurality of measurement regions displayed.

It is noted that the first and second systems could form a combined system.

BRIEF DESCRIPTION OF THE FIGURES

The accompanying drawings, which are included to provide a further understanding of the present disclosure and are incorporated in and constitute a part of this specification, illustrate embodiments of the disclosure and together with the description serve to explain the principles of the disclosure.

The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings. Reference will now be made in detail to several embodiments, examples of which are illustrated in the accompanying figures.

DETAILED DESCRIPTION

As used below in this text, the singular forms “a”, “an”, “the” include both the singular and the plural, unless the context clearly indicates otherwise. The terms “comprise”, “comprises” as used below are synonymous with “including”, “include” or “contain”, “contains” and are inclusive or open and do not exclude additional unmentioned parts, elements or method steps. Where this description refers to a product or process which “comprises” specific features, parts or steps, this refers to the possibility that other features, parts or steps may also be present, but may also refer to embodiments which only contain the listed features, parts or steps.

The enumeration of numeric values by means of ranges of figures comprises all values and fractions in these ranges, as well as the cited end points. The term “approximately” as used when referring to a measurable value, such as a parameter, an amount, a time period, and the like, is intended to include variations of +/−10% or less, preferably +/−5% or less, more preferably +/−1% or less, and still more preferably +/−0.1% or less, of and from the specified value, in so far as the variations apply to the disclosure disclosed herein. It should be understood that the value to which the term “approximately” refers per se has also been disclosed.

Unless defined otherwise, all terms present in the current disclosure, including technical and scientific terms, have the meaning which a person skilled in the art usually gives them. For further guidance, definitions are included to further explain terms which are used in the description of the disclosure.

Figure 1:
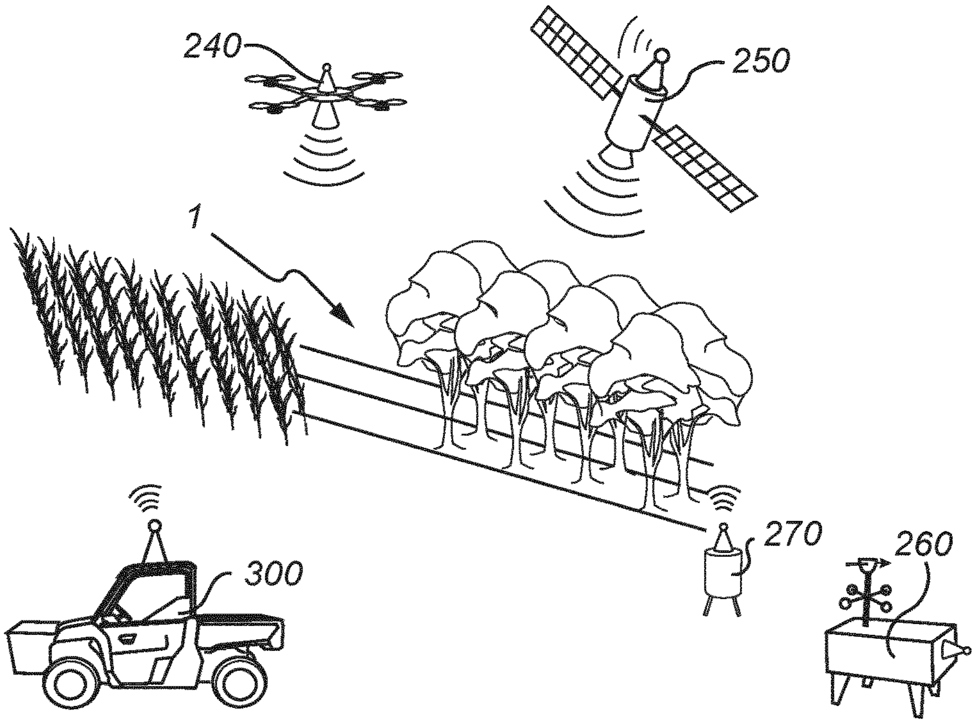
FIG. 1 shows an agricultural field according to the field of application of the present disclosure.
Figure 2:
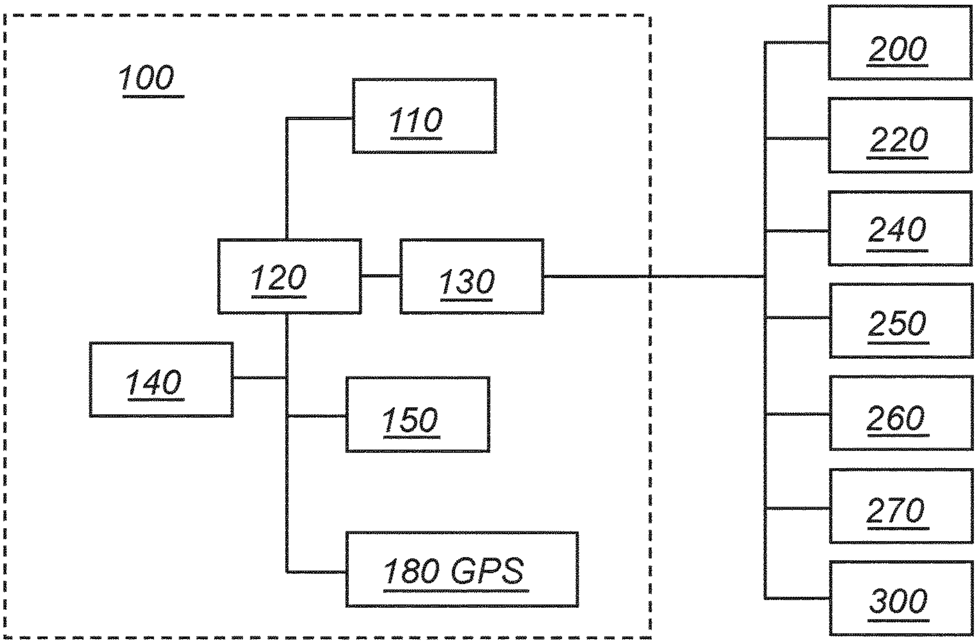
FIG. 2 shows a schematic representation of a system according to an embodiment of the present disclosure.

FIG. 1 depicts an agricultural field comprising at least one crop within an agricultural region with other systems and apparatus with which the system 100 may interoperate. In FIG. 2, an example of a system 100 according to the present disclosure is represented. System 100, according to the present disclosure, comprises several components such as a memory unit 110, a processor 120, a wired/wireless communication unit 130, an input/output unit 140. The system 100 may as well be operatively connected with a personal or mobile device 200 by means of the communication unit 130.

System 100 comprises an agricultural recommendation engine 220 to which the system may be remotely connected by means of the communication unit 130, may it be of a remote nature. In this case, the agricultural recommendation engine 220 may be represented by a computer, a remotely accessible server, other client-server architectures or any other electronic devices usually encompassed under the term data processing apparatus. System 100 does not need to be located within the vicinities of the agricultural field where the recommendation is supposed to take place.

System 100 can be represented as well by a laptop computer or handheld device, with an integrated agricultural recommendation engine 150 which can be fully operated at the farm’s location and may comprise a GPS unit 180 or any other suitable localization means, as well as a fully remote computer or server configured to establish communication with the further personal or mobile device 200 from which the users may operate the system 100.

It is to be understood that the presence of remote and integrated recommendation engines are not mutually excluding. Integrated agricultural recommendation engine 150 can be a local copy of remote agricultural recommendation engine 220 or a light version of it to support periods of low network connectivity and offline work. Further, mobile or personal device 200 is considered to be any state-of-the-art mobile computing device which allows the input and output of data by the users and comprise the usual.

System 100 and/or remote or integrated agricultural recommendation engine 220 may comprise field, farm data and external data, whereby external data comprises weather data and further data provided by weather forecast providers or other third parties. Field data may comprise amongst others, field and geographic identifiers regarding the geometry of the boundaries of the agricultural field, including the presence of areas within the agricultural field which are not managed, topographic data, crop identifiers (crop variety and type, growth status, planting data and date, plant nutrition and health status), harvest data (yield, value, product quality, estimated or recorded historic values), soil data (type, pH, soil organic matter, SOM, and/or cation exchange capacity, CEC) as well as historic series of the data. Farm data may comprise further data regarding to planned and past tasks like field maintenance practices and agricultural practices, fertilizer application data, pesticide application data, irrigation data and other field reports as well as historic series of the data, allowing the comparison of the data with past data, and further administrative data like work shifts, logs and other organizational data. Planned and past tasks may comprise activities like surveillance of plants and pests, application of pesticides, fungicides or crop nutrition products, measurements of at least one farm or field parameter, maintenance and repair of ground hardware and other similar activities.

The system 100 or agricultural recommendation engine 220 may be configured to receive and/or retrieve soil data from available online soil databases like SoilGrids from the World Soil Information, SSURGO (Soil Survey Geographic Database from the United States Department of Agriculture) or any similar soil data repository.

System 100 may be further configured to receive any of the above-mentioned data and further field data from a predetermined number of locations within or nearby the analyzed region, inputted manually by the users/farmers by means of the input unit 140 or received by the communication unit 120 from dedicated sensors 270. Further, system 100 and agricultural recommendation engine 220 may be configured to receive weather data from nearby weather stations 260 and/or external crop/farm sensors 270, as well as by means of the input unit 140. Nearby weather stations 260 and/or external crop/farm sensors 270 are configured to communicate via one or more networks. In another embodiment, weather data is provided by external weather forecast companies. Weather data may further include present and past temperatures, accumulated precipitation, relative humidity, wind speed, solar radiance, accumulated sun hours, etc.

System 100 may further be operatively connected to an agricultural apparatus 300. Examples of agricultural apparatus 300 include tractors, combines, harvesters, planters, trucks, fertilizer equipment, and any other item of physical machinery or hardware, typically mobile machinery, and which may be used in tasks associated with agriculture. In one embodiment, system 100 may be configured to communicate with the agricultural apparatus 300 by means of wireless networks in order to carry out a fertilizer application. System 100 may be further configured to produce a downloadable script file for the agricultural apparatus 300 to carry out the fertilizer application on uniform or variable rates across the field.

According to the main embodiment of the current disclosure, the method of the current disclosure is a computer-implemented method for remotely determining a chlorophyll concentration of a crop in an agricultural field, wherein the method comprises the steps of receiving remote spectral data 1000 from a plurality of wavelengths of the agricultural field, wherein the plurality of wavelengths comprises at least one wavelength from a water absorption band and at least one from a chlorophyll absorption band, generating a first index 2000, wherein the first index is a chlorophyll related vegetation index based on the at least one leaf pigment absorption band of said spectral data, generating a second index 3000, wherein the second index is a water related vegetation index based on the at least one water absorption band of said spectral data, determining the chlorophyll concentration of the crop 4000 based on the chlorophyll related vegetation index and the water related vegetation index.

The present application makes use of suitable remote spectral data for determining the in-field variability of the crop chlorophyll concentration. Remote data can be referred to data provided by imaging satellites 250 or suitable manned or unmanned imaging aerial vehicles 260. These satellite or vehicle systems are configured to communicate by means of dedicated networks and usual methods which do not need being disclosed herein. Amongst the different remote data available for use, satellite data is nowadays widely available from numerous public (LANDSAT from NASA, SENTINEL from ESA) and/or private providers. The present method is however not limited to a satellite data platform, since the spectral bands which can be of use for the present method are provided in a big range of the standard satellite platforms. While in active or passive systems designed for imaging aerial vehicles the wavelengths can be determined at will, due to the differences present across different satellite and optical sensor platforms, it is hereby not intended to limit the support of the current disclosure to exact and specific wavelengths and the given wavelengths are provided for orientation. While different factors and corrections can be introduced to account for these variabilities, the use of wavelengths proximate to the ones mentioned below should be understood since the specifications of said platforms vary accordingly. Further specifications of the required properties within the specific wavelengths are specified below.

Figure 4:
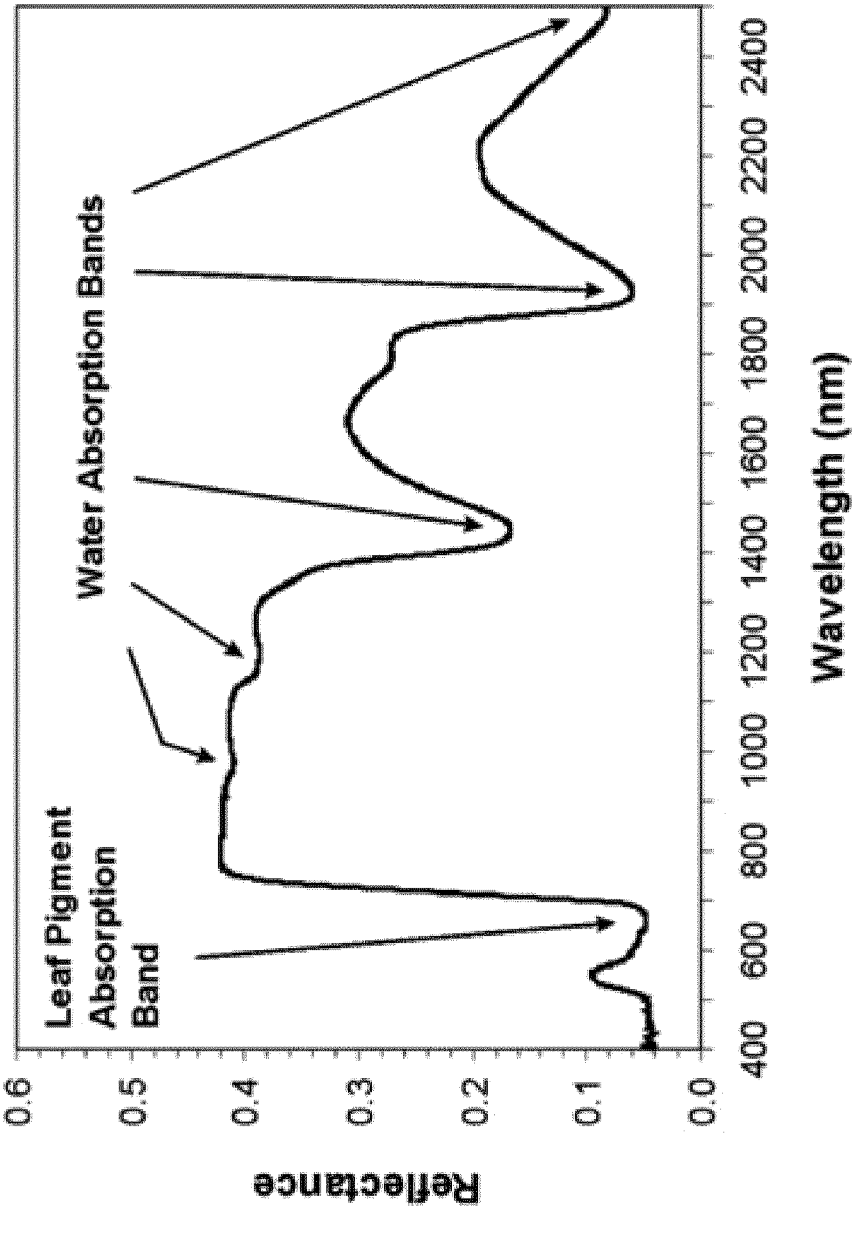
FIG. 4 shows the different chlorophyll and water absorption bands present in light spectrum.

As it is to be seen in FIG. 4, as published in Seelig et. al. (2008), "The assessment of leaf water content using leaf reflectance ratios in the visible, near-, and short-wave-infrared", different wavelengths from the light spectrum can be selected in order to determine a chlorophyll amount. The absorption spectrum of chlorophyll includes wavelengths of blue and orange-red light, as is indicated by their peaks around 450-475 nm and around 650-675 nm. In contrast, the five absorption bands in the SWIR range, centered at about 970 nm, 1200 nm, 1450 nm, 1930 nm, and 2500 nm, are mainly caused by water, offering the possibility of assessing leaf water content remotely. Moreover, as it can be clearly derived from FIG. 4, the different bands have specific breadth and reflectance properties for the different wavelengths, what will be used as well for the advantageous method of the current disclosure.

While the peaks or centers of each band are defined at specific values, the current disclosure makes use of the advantages entailed by measuring at the edge of the specific wavelength bands.

A usual approach for the determination of crop chlorophyll amount by means of vegetation indexes or coefficients used in the field of remote sensing for detecting chlorophyll in the crop canopy of agricultural fields include the normalized difference vegetation index (NDVI), which is computed as follows:

$$NDVI = \frac{NIR - RED}{NIR + RED},$$

wherein NIR represents a reflectance value related to the Near Infrared wavelengths, at about a wavelength range of 750-850 nm and RED the reflectance measurements acquired in the red visible spectrum, at about a wavelength range of 600-700 nm. While the Near Infrared spectrum may comprise a broader wavelength spectrum, for the scope of the current disclosure, the specific wavelengths which might be used are those like above which are not affected by chlorophyll in this case, nor by water for the water-related index as it will be seen below and depicted in FIG. 4 and the values specified above are orientative.

Figure 3:
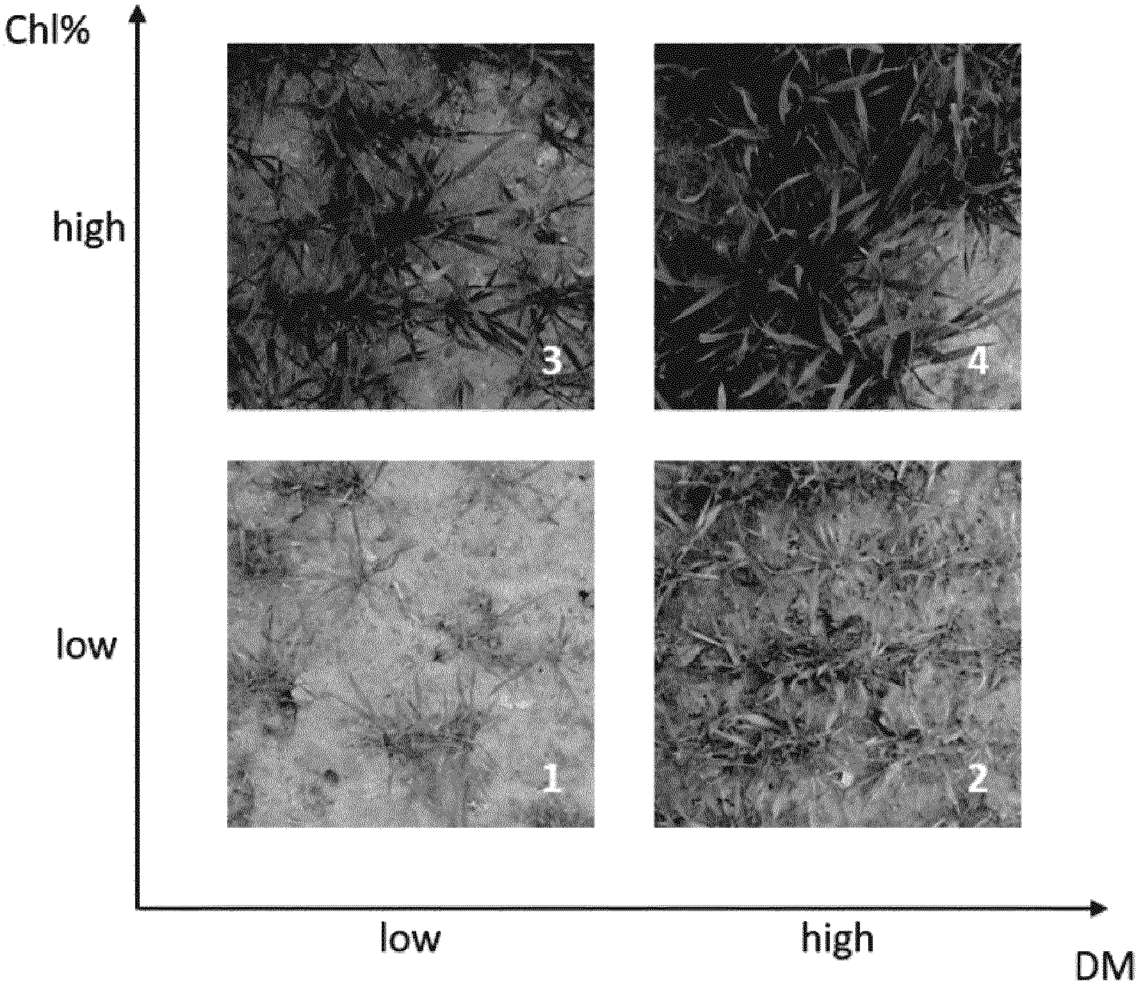
FIG. 3 shows an example of an underlying problem in the detection of chlorophyll concentration by means of remote sensing.

However, as already mentioned, NDVI and other typical satellite indexes measure chlorophyll content, or total chlorophyll per ground area (abbreviated as Chl %×DM, wherein Chl % represents the chlorophyll concentration and DM the dry matter amount of the crop present in the image). As it is depicted in FIG. 3, this presents the disadvantage that certain combinations of dry matter and chlorophyll concentration may result in similar values for the total chlorophyll per ground area. As it is to be seen in FIG. 3, wherein different images of crops are presents, when plotting the dry matter content in the horizontal axis over the chlorophyll concentration in the vertical axes, different crop properties can be assessed. Images 3 and 4 have both a high chlorophyll concentration (i.e., plants present a darker green) and images 1 and 2 present a low chlorophyll concentration (i.e., plants display a lighter green). On the other side, images 1 and 3 present a lower dry matter amount (i.e., there is more ground visible since the plants are not that developed and/or the plant density is inferior), whereas images 2 and 4 display crops with a higher dry matter. While at a closer look as depicted in FIG. 3 the differences are easy to be observed, in the case of remote sensing, wherein the images are obtained from a much greater distance, images 2 and 3 are seen as equivalents since the combination of dry matter and chlorophyll concentration results in approximately the same value of chlorophyll content per ground area. As such, NDVI is unable of determining a chlorophyll concentration measurement which is independent from the dry biomass present in the displayed crops and the advantages of the current application will be made clear below.

The method of the current disclosure comprises therefore receiving remote spectral data from a plurality of wavelengths of the agricultural field, wherein the plurality of wavelengths comprises at least one wavelength from a water absorption band as defined above and at least one from a leaf pigment or chlorophyll absorption band as defined above. The method of the current disclosure further comprises generating a first index, wherein the first index is a chlorophyll related vegetation index ($S_{Chl\ \%\times DM}$) based on the at least one leaf pigment absorption band of said spectral data. Thanks to the further processing present in the current application, said chlorophyll related vegetation index may be an index which takes into account the amount of total chlorophyll per ground area. As such, this generated chlorophyll related index may be one of the known NDVI index or any other suitable chlorophyll related index (e.g. amongst others, the following indices may as well be used: Normalized difference red edge (NDRE), Simple ratio infrared to red (IR/R), Simple ratio infrared to green" (IR/G), Soil adjusted vegetation index (SAVI), or any other equivalent chlorophyll related index).

The method of the current disclosure further comprises generating a second index, wherein the second index is a water related vegetation index ($S_{W\ \%\times DM}$) based on at least one water absorption band of said spectral data. Examples of said generated vegetation indexes or coefficient may be represented by the Normalized Difference Water Index or any other suitable water related index. As mentioned before for the chlorophyll related index, these indexes usually detect water content per ground area, and they're influenced by the crop dry mass amount present in the field.

The Normalized Difference Water Index (NDWI), in one of the usual formulations, is derived from the Near Infrared (NIR) and Short-Wave Infrared (SWIR) channels as follows:

$$NDWI = \frac{NIR - SWIR}{NIR + SWIR},$$

This formula highlights the amount of water in water bodies and comprises at least one water absorption band, since the five absorption bands SWIR range present in Sentinel-2, centered at about 970 nm, 1200 nm, 1450 nm, 1930 nm, and 2500 nm, are mainly caused by water, offering the possibility of assessing leaf water content per ground area remotely as mentioned above, and at least one band outside the water absorption band (NIR). However, the current method is not limited to the above-mentioned NDWI, and other water-related water indexes may be used (e.g., Modified NDWI (MNDWI), Weighted Normalized Difference Water Index (WNDWI) or the Water Ratio Index (WRI), or any other equivalent water related index).

Further, the method of the current disclosure comprises determining the chlorophyll concentration of the crop based on the chlorophyll related vegetation index ($S_{Chl\ \%\times DM}$) and the water related vegetation index ($S_{W\ \%\times DM}$). As such, a chlorophyll concentration index is generated based on both indexes.

In a further embodiment, determining the chlorophyll concentration based on the chlorophyll-related vegetation index and the water-related vegetation index comprises determining a chlorophyll-related biomass-invariant vegetation index ($S_{Chl\ \%}$).

In a further embodiment, determining a chlorophyll-related biomass-invariant or chlorophyll concentration index comprises establishing a deviation from a determined relationship between the first index and the second index, wherein at least one of the first index and the second index has been offset and scaled by means of crop dependent constants.

For example, such a combination may be made by means of linear regression to generate a linear relation between the chlorophyll related index and the water related index as follows:

$$S_{Chl\%} := S_{Chl\%\times DM} - (a * S_{W\%\times DM} + b)$$

In the above-mentioned equation, a and b represent crop specific constants which set up the specific relation of the indices used for a specific crop. While only a linear regression and a direct subtraction of the chlorophyll related index and the water related is shown above, non-linear approaches for fitting the expected relationship between the different indices are envisaged within the scope of the present disclosure in order to precisely determine it. Moreover, a ratio or quotient of the indices, or a shifted ratio of the indices may as well be used in order to characterize the chlorophyll related biomass invariant index according to the present disclosure.

Figure 5:
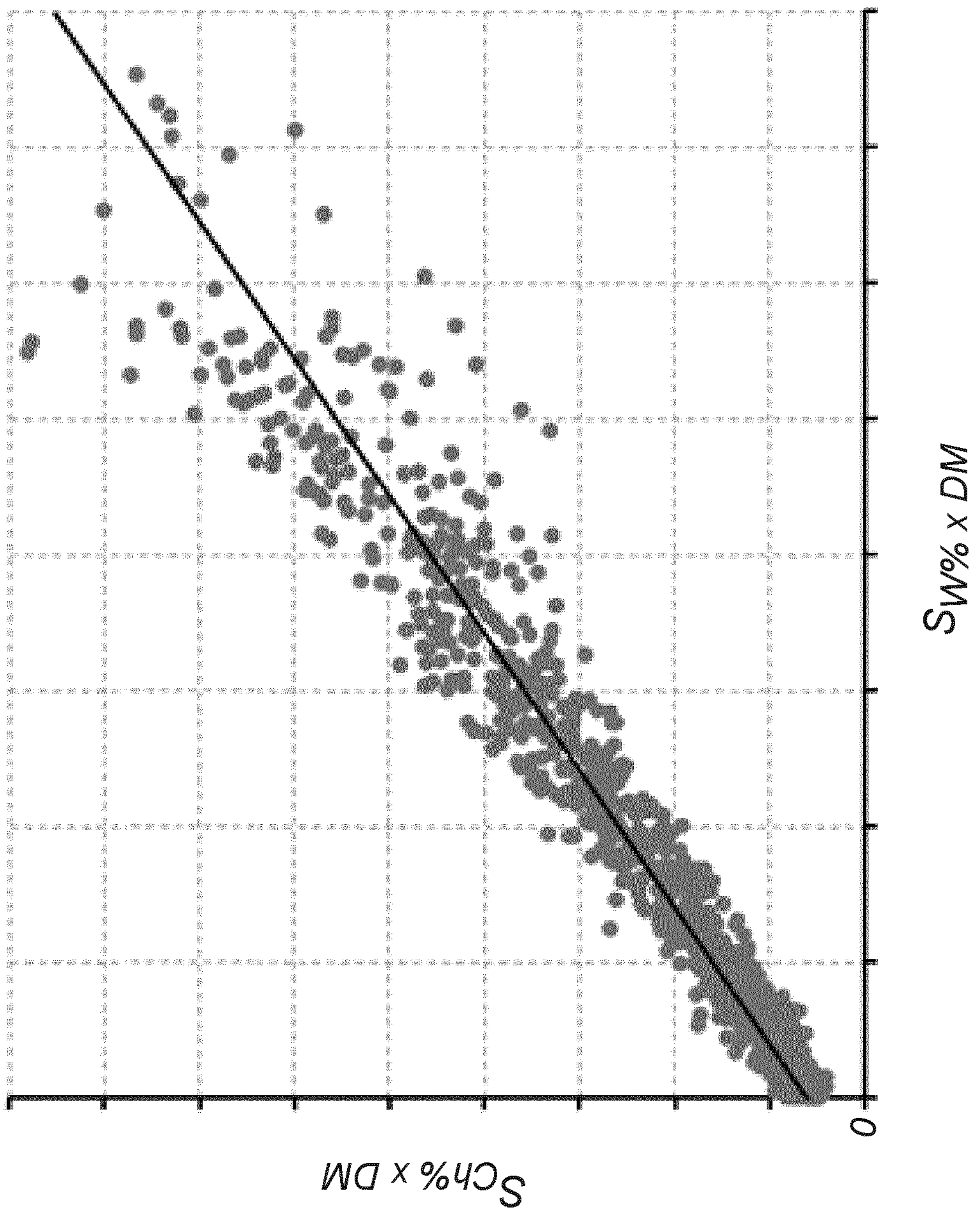
FIG. 5 shows a representation of how chlorophyll related biomass invariant index according to the present disclosure can be interpreted.

The generated coefficient is therefore a chlorophyll-related biomass-invariant vegetation index, hereby giving a direct indication of the chlorophyll concentration of the crop, without being affected by the amount of dry mass or biomass present in the fields. The meaning of such a regression function may be observed in FIG. 5. The line represents the determined relationship for a specific crop between the first (chlorophyll related) index and the second (water related) index, wherein the points present in the figure represent the specific values for each pixel within the field. As such, for a specific pixel, if the pixel is above the line (as indicated by the bi-directional arrow present in the figure), i.e., $S_{Chl\ \%}>0$, this gives an indication that the chlorophyll content in that pixel is bigger than the water content. Analogously, if the pixel is below the line, $S_{Chl\ \%}<0$, this is a clear case when the water content in that pixel is greater than the chlorophyll content, such that if the water concentration is regarded as constant, the value of the chlorophyll-related biomass invariant vegetation index gives a direct indication of the chlorophyll concentration. Since plants usually aim at maintaining their water concentration by closing their stomata, such a conclusion is valid despite the different soil moisture levels over the field.

In a further embodiment, the water-related vegetation index is based on at least one additional wavelength outside water absorption bands.

In a further embodiment, the chlorophyll-related vegetation index is based on at least one additional wavelength outside chlorophyll absorption bands.

In a further embodiment, the at least one wavelength from a water absorption band is chosen at the edge of the water absorption band.

In a further embodiment, the at least one wavelength from a chlorophyll absorption band is chosen at the edge of the chlorophyll absorption band.

When determining suitable bands, the choice is usually given by the available bands at each satellite platform which fulfill the above-mentioned requirements. For example, when using remote spectral data obtained from the Sentinel-2, in order to compute the above mentioned NDVI, the relevant bands for the determination of the chlorophyll related index may be B04 (665 nm) and B08 (842 nm). Analogously, band B11 (1610 nm) and B08 (842 nm) can be used as SWIR and NIR bands as defined above for the water related index. However, the disclosure of the current application is not limited to satellite data and other approaches can be followed in which active, or passive systems, with fully customizable wavelength selection can be designed to follow the approach of the current disclosure. In this sense, when choosing a band outside of the respective absorption bands, this "outside" band should be placed completely outside, but still as close as possible to the absorption band. Regarding the choice at the edge, but still "inside" the respective band, the choice depends on the application and the material in focus, wherein the current disclosure is directed to the analysis of crop canopy. Placing at the center of the band results in highest sensitivity at low concentrations, but may lead to saturation at higher concentrations and render very difficult distinguishing between high and very high concentrations. Hence, it is therefore advantageous to place the "inside" band off-center at the edge of the absorption band as mentioned above to overcome saturation.

Figure 6A:
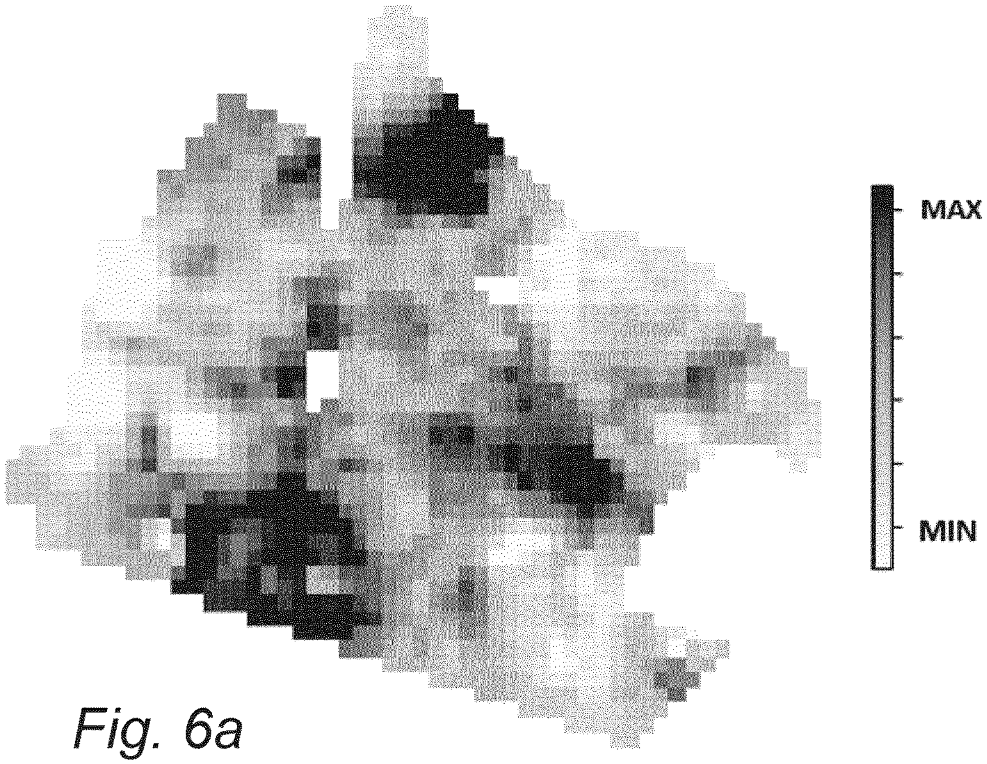
FIGS. 6A to 6C show the values of the different vegetation indexes or coefficients according to the present disclosure over an agricultural field.
Figure 6B:
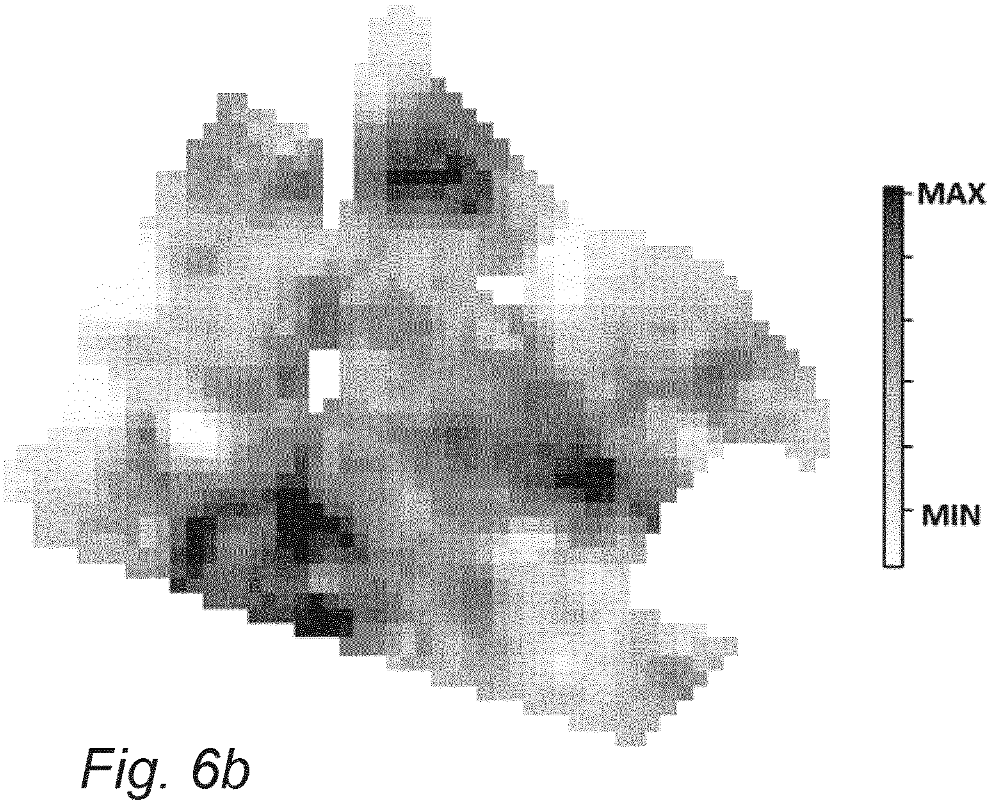
Figure 6C:
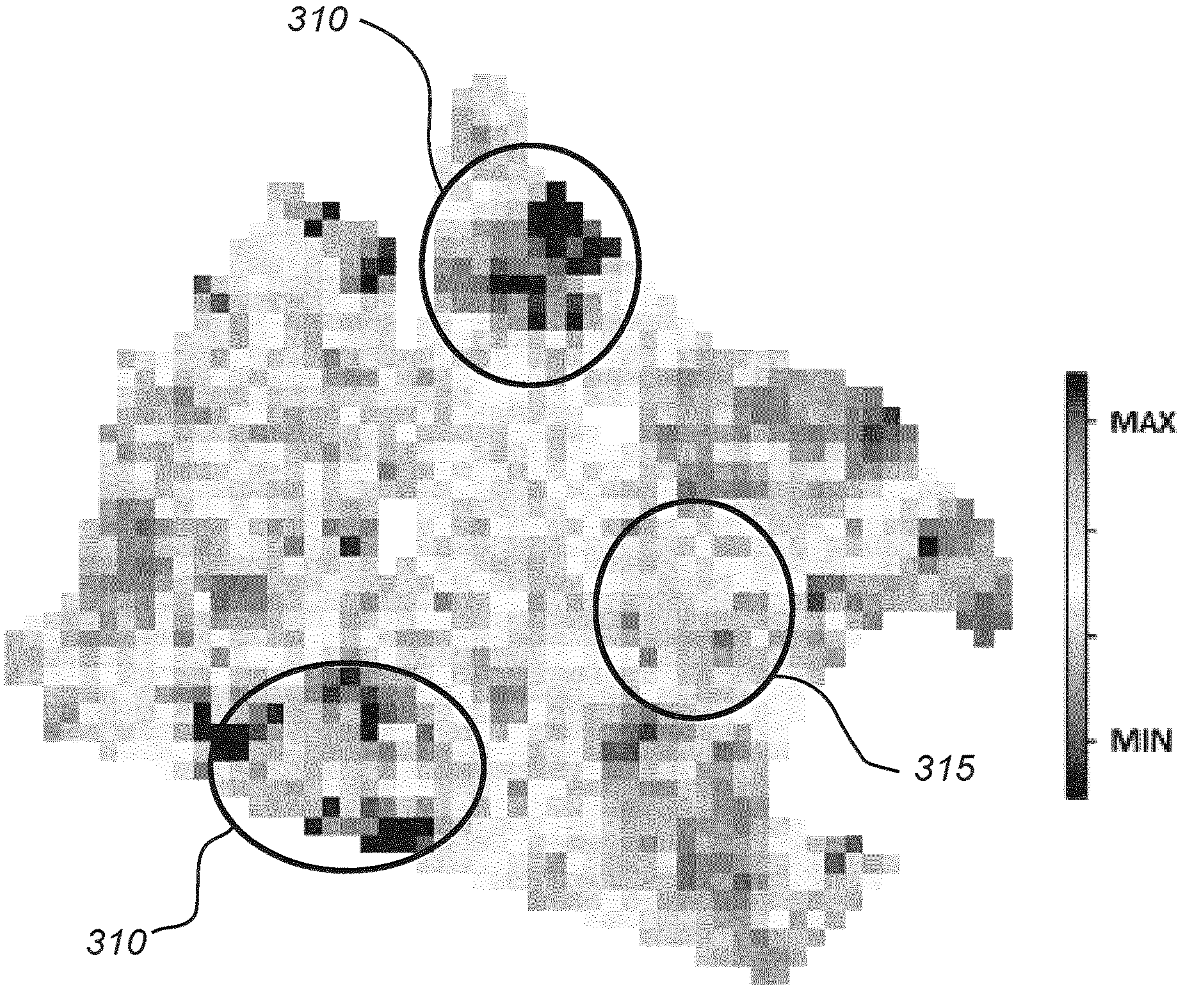
Figure 7:
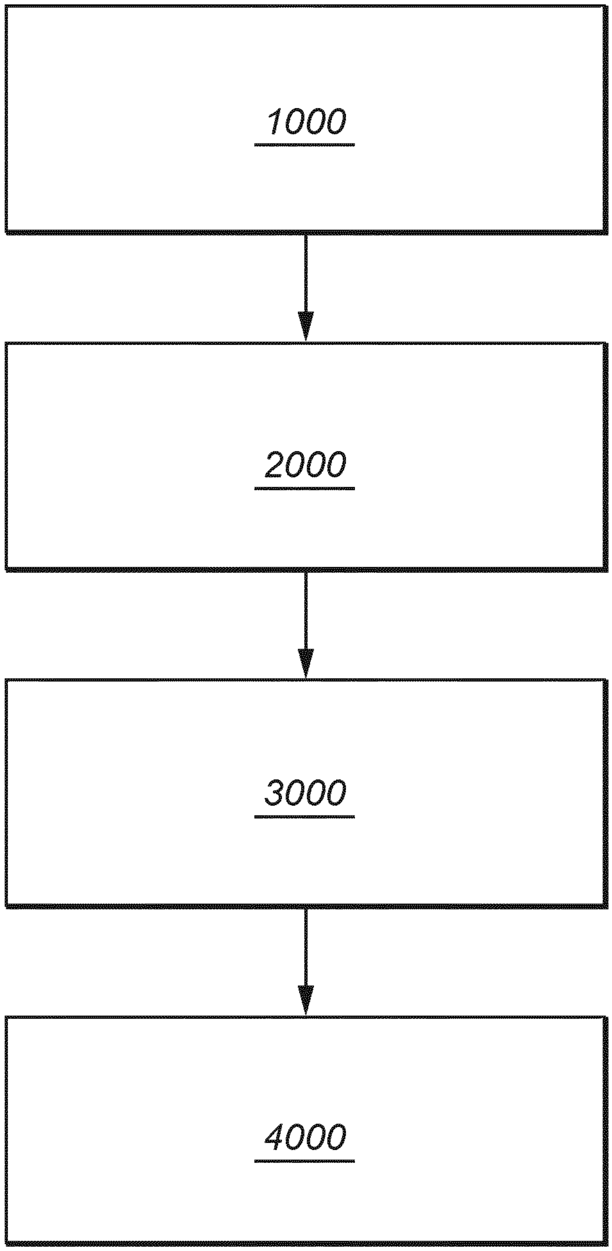
FIG. 7 shows a workflow according to one embodiment of the present disclosure.

The optimum wavelength of the "inside" band, located at the edge of the absorption band, can be found experimentally by collecting data from crops that represent the typical range of appearances in the relevant period of time, i.e. a dataset that comprises crops at different fertilization levels and at the relevant growth stages. For each analyzed waveband the index is calculated for the whole dataset, related to the target quantity (here: amount of chlorophyll or water) and the (typically linear) coefficient of determination ($r^2$) is calculated. The waveband which results in the highest $r^2$ is chosen. As it can be seen in FIGS. 6A to 6C, the different indices are shown over the same agricultural field. FIG. 6A shows the values of the chlorophyll-related index ($S_{Chl\ \%\times DM}$), FIG. 6B shows the water-related index ($S_W$) and FIG. 6C shows the chlorophyll-related biomass-invariant index ($S_{Chl\ \%}$). As it can be observed there is a high correlation between the different maps, since chlorophyll concentration and chlorophyll amount normally correlate. However, when analyzing the differences, it is clear to be seen that the chlorophyll level of the crop is highest at the darkest points shown in FIG. 6C as marked by regions 310 in FIG. 6C, wherein the other remaining areas in darkest colors in FIG. 6A are deemed to not have that highest level of chlorophyll level of the crop despite the high apparent chlorophyll content (see, e.g. region 315 in FIG. 6C, wherein same region in FIG. 6A was apparently one of the regions with higher chlorophyll content). Hence, discarding those areas where the biomass or dry matter present may influence the observations from the satellite is of high importance for determining the chlorophyll level in the crop, and as we will see below, determine suitable and relevant measurement regions for a crop chlorophyll measurement device.

The current disclosure aims as well at improving the readings by a suitable combination of remote sensing and local sensing. As such, in a further embodiment, the method further comprises the steps of receiving at least one chlorophyll concentration of the crop measured with a chlorophyll measurement device and determining the chlorophyll level of the crop based on the remotely determined chlorophyll concentration and the received measured crop chlorophyll concentration. Once the crop chlorophyll concentration for the whole agricultural field has been determined based on the remote spectral data, obtaining a "chlorophyll map" of the distribution of the chlorophyll concentration of the crop in the agricultural field, the at least one direct measurement of the chlorophyll concentration can be used to adjust the overall remotely determined chlorophyll concentration of the crop. Remotely determined magnitudes might present a certain offset due to the nature of remote sensing, by biasing the remotely determined chlorophyll concentration by means of a local measurement, the accuracy of the determined chlorophyll concentration is improved.

While it is clear from the current disclosure the advantages of using crop chlorophyll concentration measurement devices which directly benefit from the remote determination, the current disclosure envisages as well the approach with other crop nutrient measurement devices, wherein the combination still produces improved crop knowledge and more accurate fertilizer recommendations. As such, other possibilities include crop chlorophyll content measurement devices, crop nitrogen measurement devices or crop nutrient measurement devices and the like which can be related to chlorophyll concentration or which measurement can be combined with the remotely determined crop chlorophyll concentration. For example, laser induced breakdown spectroscopy measurement devices may directly measurement nitrogen, directly related to chlorophyll, and/or other nutrients like Phosphorus or Potassium. In any of those possible cases, the fertilizer recommendation can be improved by introducing chlorophyll values expected throughout the field on top of the possible Potassium or Phosphorus recommendation, or the Nitrogen level as determined by the laser induced breakdown spectroscopy measurement devices may be directly related to the chlorophyll concentration and with it the remotely determined crop chlorophyll concentration used for producing "chlorophyll maps" which derive an improved determination of the crop chlorophyll content and/or improved fertilizer recommendation. As such, there is no strict limitation to crop chlorophyll concentration measurement devices within the current disclosure, apart from the specific cases where the direct relation can be exploited for improving the remote crop chlorophyll concentration determination.

While the advantages of a direct determination of chlorophyll levels in crops is clear, further advantages of the application are to be seen in combination when a direct local measurement of crop chlorophyll concentration content is carried out by means of a crop chlorophyll concentration measurement device, or as mentioned above with other crop nutrient measurement devices. As known from the PCT patent application PCT/EP2022/056462, which is hereby incorporated by reference, determining measurement regions for crop nutrient measurement devices presents the great advantage that relevant measurements for obtaining a crop nutrient status of a crop can be achieved. While the general link between nitrogen and chlorophyll is known, the effect of biomass (or dry matter) as explained above on usual chlorophyll related vegetation indices is as well of great importance for determining the measurement regions following the disclosure of PCT/EP2022/056462 mentioned above when carrying out measurements with specific crop chlorophyll or nutrient measurement devices. As such, determining these measurement regions based on a specific chlorophyll-related biomass-invariant index as defined above is of great advantage. As such, in a further embodiment, the method of the current disclosure may further comprise determining at least one measurement region for carrying out at least one measurement with a crop nutrient measurement device in said measurement region for providing a fertilizer recommendation to a crop comprising the steps of determining the at least one measurement region based on the remotely determined chlorophyll concentration.

In a further embodiment, the crop nutrient measurement device is a crop chlorophyll measurement device. In a further embodiment, the crop nutrient measurement is a crop chlorophyll concentration measurement device.

Figure 8:
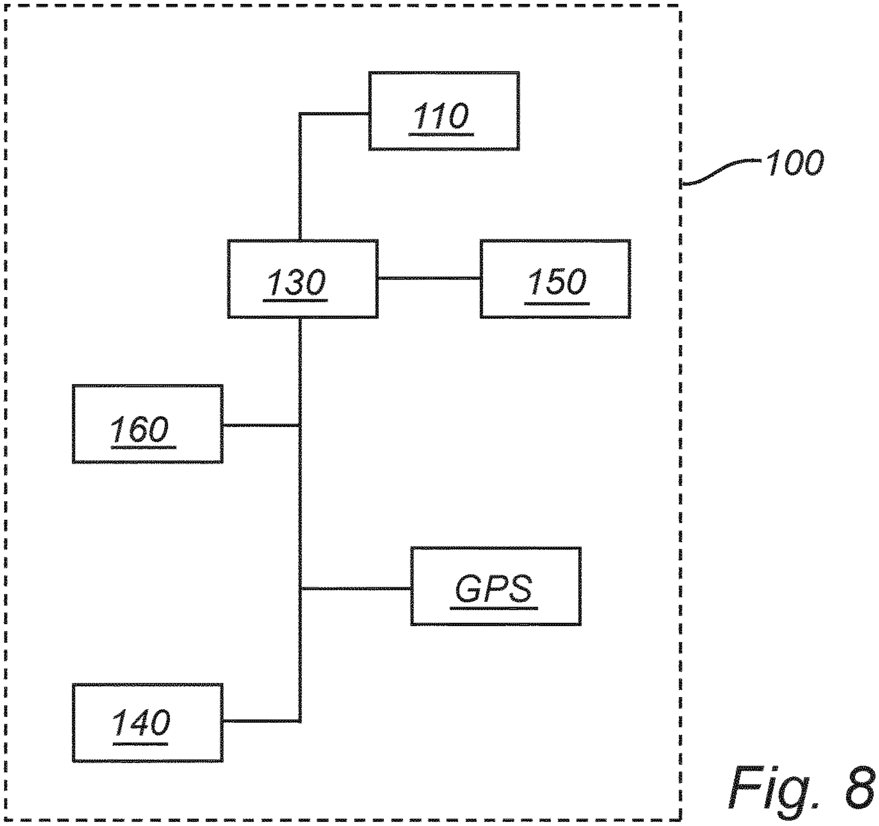
FIG. 8 shows a schematic representation of a system according to a further embodiment of the present disclosure.

A system according to the disclosure of PCT/EP2022/056462 and as shown in the schematic representation of FIG. 8 and as one of the possible constructional embodiments according to the present disclosure in FIG. 9 will be described below. It is to be mentioned that a system as described from now on may as well be configured to carry the method steps described above, since such a system comprises the necessary processing and communication unit. However, the system may be specially configured to carry out the local crop nutrient or chlorophyll measurements as well as the measurement region determination and as such some reference signs are shared amongst the different embodiments (e.g. memory unit 110, processor 120, . . . ). FIG. 8 shows a schematic representation of system 100 according to the following embodiments, wherein system 100 comprises a crop nutrient measurement device or a crop chlorophyll concentration measurement device 160 and a communication unit 130.

Crop nutrient measurement devices and crop chlorophyll measurement devices present different constructional arrangements. Some embodiments of these devices comprise an own communication unit 130 or are operably connected to a mobile communication device like a laptop, smartphone or tablet or other mobile electronic device with full processing capabilities which functions as communication unit, as it can be seen in FIG. 9. In other embodiments, the devices are peripherals attached to the mobile communication device, using a camera of the mobile communication device as optical detection unit, basing respectively the determination of the crop nutrient, chlorophyll concentration or content on the reflectivity or transmissivity of the leaves at specific wavelengths. However, no specific determination of the nutrient or chlorophyll detection principle is intended for the goal of the current disclosure, since the neither the specificities of the detecting principle nor the constructional arrangement of the system are intrinsically related to the advantages provided by the current disclosure.

Communication unit 130 may therefore be an integral or dedicated unit integrated with the crop nutrient or crop chlorophyll measurement device 160 or a separate electronic communications device operably connected to the crop nutrient or chlorophyll measurement device 160. In a further embodiment, system 100 may be a handheld mobile device. Different examples of these embodiments would be represented by already existing devices, like the N-Tester BT® and the N-Tester Clip®, which are incorporated herein by reference as direct crop chlorophyll concentration measurement devices.

System 100 comprises several components such as a processor 120, a communication unit 130, a location determining or GPS unit 180 or equivalent (Glonass, Beidou, Galileo . . . ) and a memory unit 110. System 100 may further comprise an input/output unit 140, which might take form as separate devices (a display and a keyboard) or which might be combined as a touch sensitive screen. System 100 is however not limited by these components and may further comprise other elements as customary within the standard practice.

System 100 may further comprise an integrated agricultural recommendation engine 150 or a remote agricultural recommendation engine 210 (not shown in FIG. 9) to which the system may be remotely connected by means of the communication unit 130. System 100 and/or agricultural recommendation engines 150 or 210 may be represented by a single device or a distributed series of devices intercommunicated. As such, each can be represented by computer, a remotely accessible server, other client-server architectures or any other electronic devices usually encompassed under the term data processing apparatus. As such, all steps within the method of the current disclosure may be carried out (partly) separately or jointly in any of the processing units of system 100 or agricultural recommendation engine 210.

Figure 9:
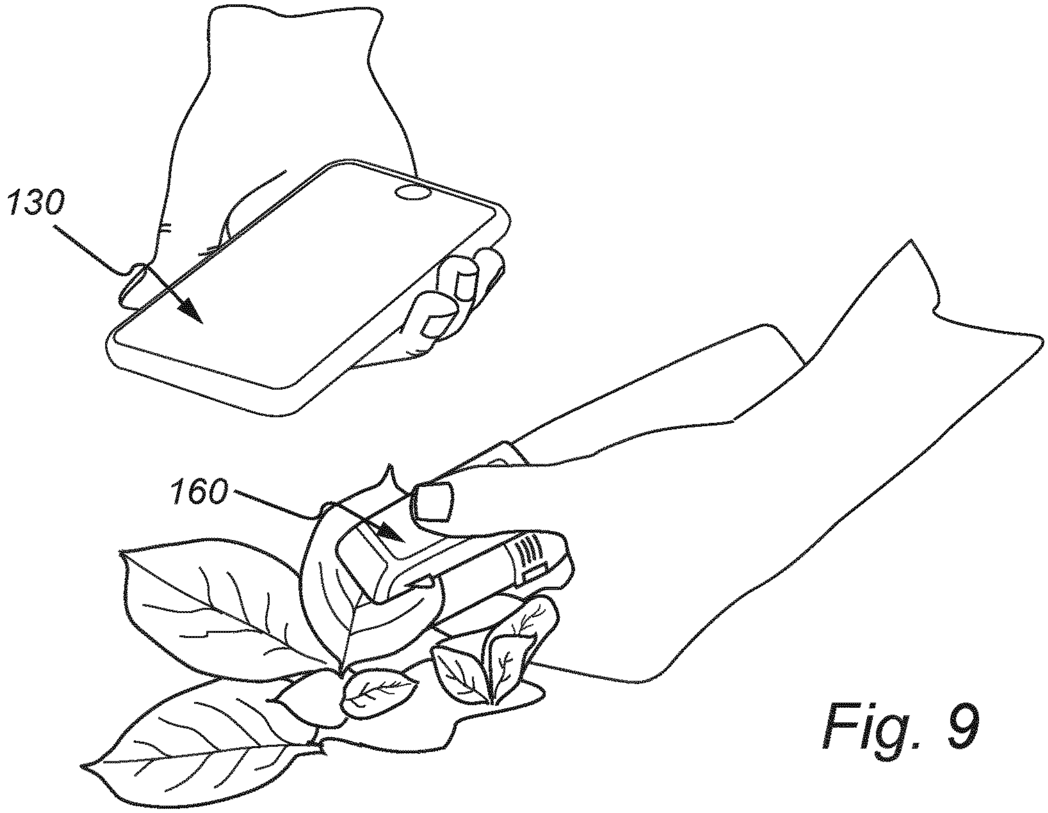
FIG. 9 shows a system according to one of the embodiments of the present disclosure.

FIG. 9 shows an exemplary use according to one embodiment of the system of the present disclosure wherein the communication unit 130 and the crop nutrient or chlorophyll measurement device 160 are different elements. Crop nutrient or chlorophyll measurement device 160 may be operatively connected to the communication unit 130 by means of a suitable wired or wireless connection. However, other embodiments where the system is formed by a mobile phone and a peripheral element operatively connected to the mobile phone enables the mobile phone to determine the crop nutrient or chlorophyll level based on the transmissivity of light are as well included within the current disclosure. Farmers, when in a field, are able of determining the plant nutrient content by directly analyzing one or more leaves of a plant present in the agricultural field. Other embodiments within the scope of the current disclosure include other constructional arrangements in which the crop nutrient or chlorophyll measurement device 110 and the communication unit 120 may be integrally formed in a single device.

By choosing regions in the agricultural field wherein the chlorophyll concentration is relevant and representative of the crop chlorophyll concentration distribution over the field, a more precise fertilization recommendation can be achieved.

In a further embodiment, determining the at least one measurement region based on the determined chlorophyll level comprises determining a measurement region within the agricultural field wherein the crop chlorophyll content is within a predetermined threshold of a first predetermined value of the chlorophyll content within the field.

In a further embodiment, the predetermined value is defined as the average value of the chlorophyll concentration within the field, i.e., being $S_{Chl\ \%}$ the chlorophyll-related biomass-invariant index, determining the regions wherein $S_{Chl\ \%}$ is chosen such that 0.8 Avg $(S_{Chl\ \%})$<Sch %<1.2 Avg $(S_{Chl\ \%})$, wherein Avg$(S_{Chl\ \%})$ represents the average of the chlorophyll-related biomass-invariant index over the agricultural field. In a further embodiment, Sch % is chosen such that 0.9 Avg ($S_{Chl\ \%}$)<$S_{Chl\ \%}$<1.1 Avg ($S_{Chl\ \%}$), more specifically such that 0.95 Avg ($S_{Chl\ \%}$)<Sch %<1.05 Avg ($S_{Chl\ \%}$).

In a further embodiment, the predetermined value is defined as the maximum value of the chlorophyll concentration within the field, i.e., $S_{Chl\ \%}$ is chosen such that $S_{Chl\ \%}$>0.8 max ($S_{Chl\ \%}$), wherein max ($S_{Chl\ \%}$) represents the maximum value of the chlorophyll-related biomass-invariant index over the agricultural field. In a further embodiment, $S_{Chl\ \%}$ is chosen such that $S_{Chl\ \%}$>0.9 max ($S_{Chl\ \%}$), more specifically such that $S_{Chl\ \%}$>0.95 max ($S_{Chl\ \%}$).

In a further embodiment, the method further comprises receiving a chlorophyll concentration measurement of the crop at the at least one measurement region and adjusting the determined chlorophyll level of the crop based on the received chlorophyll concentration measurement. Analogously to the previous embodiment, the direct measurement of the crop chlorophyll concentration improves the remotely determined chlorophyll concentration determination of the whole crop since a reliable measurement can be used to eliminate any offset the remote spectral data might comprise due to the nature of remote measuring systems, even more now that a specific region relevant for such a measurement has been determined.

Figure 11:
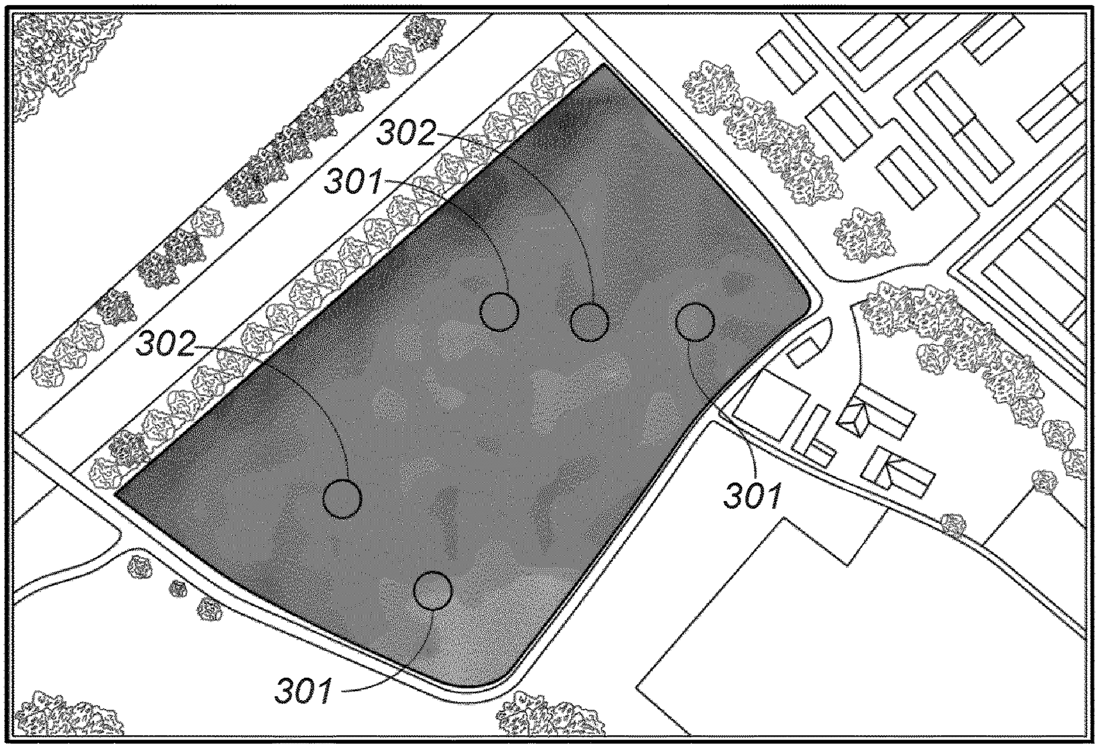
FIG. 11 shows the measurement regions as determined following another embodiment of the present disclosure.

In a further embodiment, determining at least one measurement region comprises determining at least one first measurement region 301 and at least one second measurement region 302, as it is to be seen in FIG. 11, wherein the at least one first measurement region is selected amongst the areas of the agricultural field wherein the crop chlorophyll concentration is within a first predetermined threshold from a first predetermined value of the crop chlorophyll concentration in the agricultural field and wherein the at least one second measurement region is selected amongst the areas of the agricultural field wherein the crop chlorophyll concentration is within a second predetermined threshold from a second predetermined value of the crop chlorophyll concentration in the agricultural field.

In a further embodiment, the first predetermined value may be a value representative of the maximum value of the crop chlorophyll concentration and the second predetermined value may be a value representative of the median, average or any other measure of central tendency of the crop chlorophyll concentration.

That is, the first predetermined value, $S_{Chl\ \%}$ is chosen such that $S_{Chl\ \%}$>0.8 max ($S_{Chl\ \%}$), wherein max ($S_{Chl\ \%}$) represents the maximum value of the chlorophyll-related biomass-invariant index over the agricultural field. In a further embodiment, $S_{Chl\ \%}$ is chosen such that $S_{Chl\ \%}$>0.9 max ($S_{Chl\ \%}$), more specifically such that $S_{Chl\ \%}$>0.95 max ($S_{Chl\ \%}$).

Regarding the second predetermined value being a value representative of the median or the like, being $S_{Chl\ \%}$ the chlorophyll-related biomass-invariant index, determining the regions wherein the second predetermined value may be a value representative of the median, average or the like, $S_{Chl\ \%}$ is chosen such that 0.8 Avg ($S_{Chl\ \%}$)<$S_{Chl\ \%}$<1.2 Avg ($S_{Chl\ \%}$), wherein Avg ($S_{Chl\ \%}$) represents the average of the chlorophyll-related biomass-invariant index over the agricultural field. In a further embodiment, $S_{Chl\ \%}$ is chosen such that 0.9 Avg ($S_{Chl\ \%}$)<$S_{Chl\ \%}$<1.1 Avg ($S_{Chl\ \%}$), more specifically such that 0.95 Avg ($S_{Chl\ \%}$)<$S_{Chl\ \%}$<1.05 Avg ($S_{Chl\ \%}$). As mentioned above, any other measure of central tendency can be used instead of the average function.

In a further embodiment, when the at least one first measurement region is chosen amongst the areas within a certain threshold of the maximum value of the crop chlorophyll concentration, and the at least one second measurement region is chosen amongst the areas within a threshold of the average or the like values of the crop chlorophyll concentration, a fertilizer recommendation may be determined based on the ratio of the first crop chlorophyll concentration and the second crop chlorophyll concentration. For example, based on the first crop chlorophyll concentration (Chl1) and the second crop chlorophyll concentration (Chl2), a fertilizer blanket fertilizer application for the whole field may be generated according to the following relation:

$$N_{REC} = f(Chl2/Chl1);$$

Wherein NREC represents the amount of fertilizer needed generated by means of a suitable agronomic function f. The value is of specific relevant when the ratio Chl2/Chl1 is below a predetermined value which indicates the room for improvement in the nutrition of the averagely nurtured areas, since this would indicate that the regions with an average value of the coefficients, and those below it, will be benefitted from the fertilizer application. In an embodiment, the predetermined value may be comprised between 0.7 and 1, more specifically between 0.8 and 1, more specifically between 0.9 and 1. As mentioned above, while the specific chlorophyll concentration relation is shown here, similar relations when estimating crop nutrients and/or chlorophyll content may be established.

In a further embodiment, the method further comprises carrying out the fertilizer application excepting at the areas amongst which the first measurement regions have been chosen. When the first measurement regions have been chosen amongst the areas where the first predetermined value may be a value representative of the maximum value of the crop chlorophyll concentration, these regions are supposed to have no nutrient stress and therefore have a lesser need of fertilizer.

According to a further embodiment, the method further comprises generating instructions for an agricultural apparatus to carry out a fertilizer application based on the determined and/or adjusted chlorophyll concentration of the crop.

In a further embodiment, generating instructions comprises producing a machine-readable application prescription map based on the fertilizer recommendation to control the agricultural apparatus. In a further embodiment, the method may comprise establishing direct communication with an agricultural apparatus 300 over standard networks to carry out the fertilizer application in an automatized manner. In a further embodiment, the current method may be configured to generate a downloadable script or file, which can be used for uploading such an application prescription map by physical means to an agricultural apparatus.

In a further embodiment, the fertilizer recommendation is carried out by means of a fertilizer application system, like a spreader or specially adapted agricultural machinery.

Figure 10:
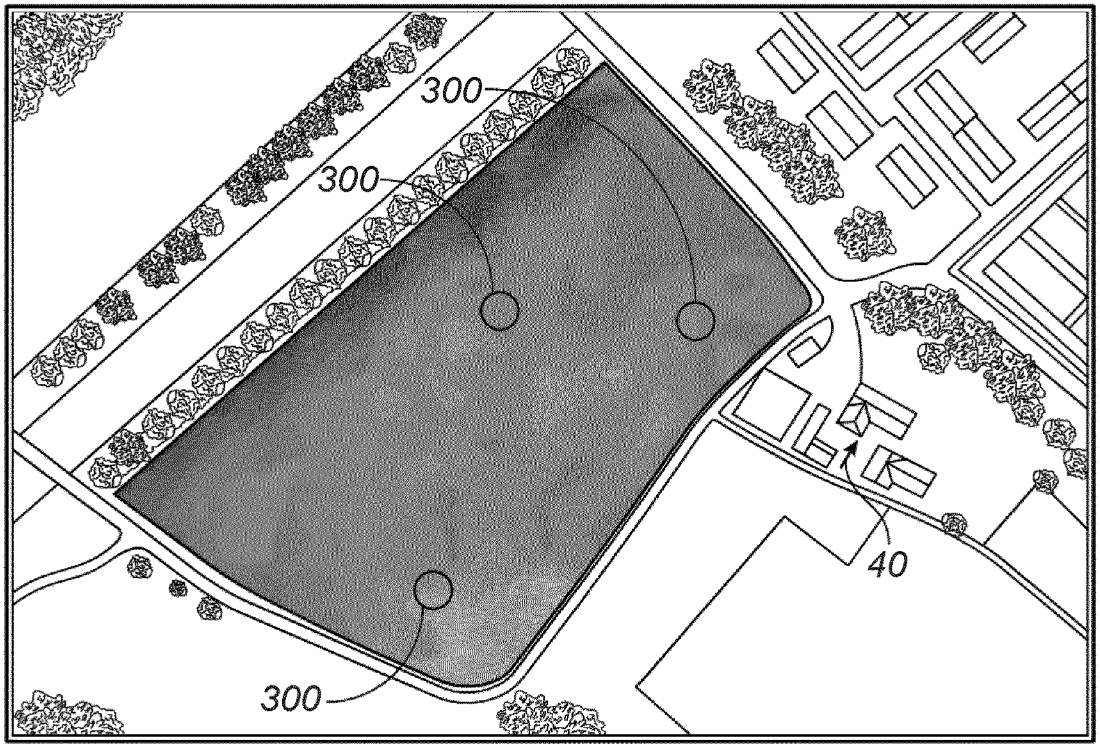
FIG. 10 shows the measurement regions as determined following one embodiment of the present disclosure.

System 100 may further comprise a dedicated Graphical User Interface as shown in FIGS. 10 and 11 which assists the farmers in choosing the measurement regions. As previously mentioned, the system may be configured to display a plurality of measurement regions as determined by the different embodiments of the current disclosure to the farmers by means of display unit 130 for the farmers to select by means of input unit 140 the best suitable option.

Although the system 100 is of a mobile nature, the Graphical User Interface may as well be run on a laptop or desktop electronic device at the farm in preparation of the daily activities, wherein it can be communicated with system 100 by means of usual networks to transmit the determined measurement regions and the navigation possibilities.

In an embodiment as shown in the Figures, the current system 100 may comprise an input unit 140 and display unit 130 combined as a touch sensitive display 135.

The farmers, when planning to carry out the measurements, may first select at least one field from a plurality of agricultural fields to be inspected. The fields may comprise crops of the same or different type and at least a part of the field may be determined in which the crop for which the fertilizer recommendation is intended is located. System 100 may be configured to display the at least one agricultural field determined. System 100, when displaying the at least one field may further display an icon 40 representative the location of the farmers if in the view.

FIG. 10 shows the embodiment where a plurality of measurement regions 300 is displayed. In this case, the farmers may select at least one of the measurement regions 300, upon his convenience or based on further tasks planned on the field, wherein a measurement may be conducted.

FIG. 11 shows the embodiment where a plurality of first measurement regions 301 and a plurality of second measurement regions 302 are displayed. In this case, system 100 is further configured to display at least one first and at least one second measurement regions within the agricultural field System 100 may be configured to display first a plurality of first measurement regions allowing the farmers to select their preferred first measurement region. Upon selection, system 100 may display a plurality of second measurement regions. Based on the selection of the first measurement region 301, the system is configured to show a plurality of second measurement regions 302. These may be selected such that the plurality of measurement regions which are within a predetermined distance from the first measurement region 301 are displayed. While the example has been explained here in a predetermined order, it is clear that the order can be reversed without departing from the scope of the present disclosure and the measurement regions processed accordingly, achieving herewith the same advantages.

Although the process steps, method steps, algorithms or the like may be described in a sequential order or by the use or ordinal numbers, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently. Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product. While the foregoing describes various embodiments of the disclosure, other and further embodiments of the disclosure may be devised without departing from the basic scope thereof. The scope of the disclosure is determined by the claims that follow. The disclosure is not limited to the described embodiments, versions or examples, which are included to enable a person having ordinary skill in the art to make and use the disclosure when combined with information and knowledge available to the person having ordinary skill in the art.

While the present disclosure has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The disclosure in its broader aspects is therefore not limited to the specific details, representative apparatus and method, and illustrative example shown and described.

Accordingly, the detailed description thereof should not be construed as restrictive in all aspects but considered as illustrative. The scope of the disclosure should be determined by reasonable interpretation of the appended claims and all changes that come within the equivalent scope are included in the scope of the current disclosure.

The invention claimed is:

1. A computer-implemented method for remotely determining a chlorophyll concentration of a crop in an agricultural field, wherein the method comprises steps of:

a) receiving remote spectral data from a plurality of wavelengths of the agricultural field, wherein the plurality of wavelengths comprises at least one wavelength from a water absorption band and at least one from a chlorophyll absorption band, b) generating a first index, wherein the first index is a chlorophyll related vegetation index based on the at least one chlorophyll absorption band of said spectral data, c) generating a second index, wherein the second index is a water related vegetation index based on the at least one water absorption band of said spectral data, and d) determining the chlorophyll concentration of the crop based on the chlorophyll related vegetation index and the water related vegetation index.

2. The method according to claim 1, wherein determining the chlorophyll concentration based on the chlorophyll related vegetation index and the water related vegetation index comprises determining a chlorophyll related biomass invariant vegetation index.

3. The method according to claim 2, wherein determining the chlorophyll related biomass invariant vegetation index comprises establishing a deviation from a determined relationship between the first index and the second index, wherein at least one of the first vegetation index and the second vegetation index has been offset and scaled by means of crop dependent constants.

4. The method according to claim 3, wherein the water related vegetation index is based on at least one additional wavelength outside water absorption bands.

5. The method according to claim 4, wherein the at least one wavelength from the water absorption band is chosen at an edge of the water absorption band.

6. The method according to claim 5, wherein the method further comprises the steps of:

receiving at least one chlorophyll concentration measurement of the crop measured with a chlorophyll concentration measurement device; and determining the chlorophyll concentration of the crop based on the remotely determined chlorophyll concentration and the received measured crop chlorophyll concentration.

7. A computer-implemented method for determining at least one measurement region for carrying out at least one measurement with a crop nutrient measurement device in the at least one measurement region for providing a fertilizer recommendation to the crop, comprising steps of:

determining the chlorophyll concentration of the crop according to claim 1; and determining the at least one measurement region based on the determined chlorophyll concentration.

8. The computer-implemented method according to claim 7, wherein the crop nutrient measurement device is a chlorophyll concentration measurement device and the method further comprises the steps of:

receiving a chlorophyll concentration measurement of the crop at the at least one measurement region measured with the chlorophyll concentration measurement device; and adjusting the remotely determined chlorophyll concentration of the crop based on the received chlorophyll concentration measurement.

9. The computer-implemented method according to claim 7, wherein determining the at least one measurement region comprises:

determining at least one first measurement region and at least one second measurement region;

wherein the at least one first measurement region is selected amongst the areas of the agricultural field wherein the crop chlorophyll concentration is within a first predetermined threshold from a first predetermined value of the crop chlorophyll concentration in the agricultural field; and wherein the at least one second measurement region is selected amongst the areas of the agricultural field wherein the crop chlorophyll concentration is within a second predetermined threshold from a second predetermined value of the crop chlorophyll concentration in the agricultural field.

10. The computer-implemented method according to claim 9, wherein the method further comprises:

receiving at least one first crop nutrient measurement at the first measurement region;

receiving at least one second crop nutrient measurement at the second measurement region; and determining the fertilizer recommendation based on the at least one first and at least one second crop nutrient measurements.

11. A system for determining the chlorophyll concentration configured to carry out the method according to claim 1.

12. A system for determining at least a measurement region for providing the fertilizer recommendation to the crop configured to carry out the method according to claim 7.

13. The system according to claim 12, comprising a display and an input unit, wherein the system further comprises a graphical user interface, GUI, configured to display a plurality of measurement regions, wherein the graphical user interface is further configured to receive an input for selecting one measurement region from the plurality of measurement regions displayed.

14. A non-transitory computer-readable storage medium comprising instructions which, when executed by a computer system, cause the computer system to carry out the method of claim 1.

15. A computer program product comprising instructions which, when the program is executed by a computer system, cause the computer system to carry out the method of claim 1.

16. The method according to claim 1, wherein the water related vegetation index is based on at least one additional wavelength outside water absorption bands.

17. The method according to claim 1, wherein the at least one wavelength from the water absorption band is chosen at an edge of the water absorption band.

18. The method according to claim 1, wherein the method further comprises the steps of:

receiving at least one chlorophyll concentration measurement of the crop measured with a chlorophyll concentration measurement device; and determining the chlorophyll concentration of the crop based on the remotely determined chlorophyll concentration and the received measured crop chlorophyll concentration.

* * * * *